(12) United States Patent
Úbeda et al.

(10) Patent No.: US 11,405,838 B2
(45) Date of Patent: Aug. 2, 2022

(54) CARRIER BANDWIDTH ADJUSTMENT IN A CELLULAR RADIO NETWORK

(71) Applicant: Vodafone IP Licensing Limited, Newbury (GB)

(72) Inventors: Carlos Úbeda, Newbury (GB); María De La Rosa, Newbury (GB); Francisco Domínguez Romero, Newbury (GB)

(73) Assignee: VODAFONE IP LICENSING LIMITED

( * ) Notice: Subject to any disclaimer, the term of this patent is extended or adjusted under 35 U.S.C. 154(b) by 162 days.

(21) Appl. No.: 17/005,778

(22) Filed: Aug. 28, 2020

(65) Prior Publication Data
US 2021/0076286 A1 Mar. 11, 2021

(30) Foreign Application Priority Data

Sep. 6, 2019 (EP) .................................... 19382775

(51) Int. Cl.
*H04W 4/00* (2018.01)
*H04W 36/22* (2009.01)
*H04B 7/185* (2006.01)
*H04W 36/30* (2009.01)

(52) U.S. Cl.
CPC ........ *H04W 36/22* (2013.01); *H04B 7/18504* (2013.01); *H04W 36/30* (2013.01)

(58) Field of Classification Search
CPC ............ H04B 7/18504; H04B 7/18541; H04B 7/18513; H04B 7/2041; H04W 84/06; H04W 72/0446; H04W 36/06
See application file for complete search history.

(56) References Cited

U.S. PATENT DOCUMENTS

| 5,625,868 A | 4/1997 | Jan et al. |
| 10,820,321 B2* | 10/2020 | Ma .......................... H04L 5/001 |
| 2017/0085411 A1 | 3/2017 | Noerpel et al. |
| 2017/0371040 A1 | 12/2017 | Whitefield et al. |
| 2018/0376393 A1* | 12/2018 | Wu ................... H04W 36/0055 |
| 2019/0327007 A1* | 10/2019 | Wang ................ H04W 72/0453 |

OTHER PUBLICATIONS

"A Vision and Framework for the High Altitude Platform Station (HAPS) Networks of the Future", p. 1-45, Kurt et al., 2020.*
European Search Report for EP 19382775.5 dated Mar. 3, 2020.

* cited by examiner

*Primary Examiner* — Khalid W Shaheed
(74) *Attorney, Agent, or Firm* — Workman Nydegger

(57) ABSTRACT

A method for adjusting a bandwidth of a carrier signal providing access to a cellular radio network through a High Altitude Platform, HAP, the carrier signal being transmitted within a predetermined frequency spectrum channel, the HAP transmitting a first carrier signal of a first bandwidth in a first part of the predetermined frequency spectrum allocation, the method comprising: configuring transmission of a second carrier signal of a second bandwidth in a second part of the predetermined frequency spectrum allocation, the second bandwidth being different to the first bandwidth; and configuring handover of traffic from the first carrier signal to the second carrier signal.

15 Claims, 7 Drawing Sheets

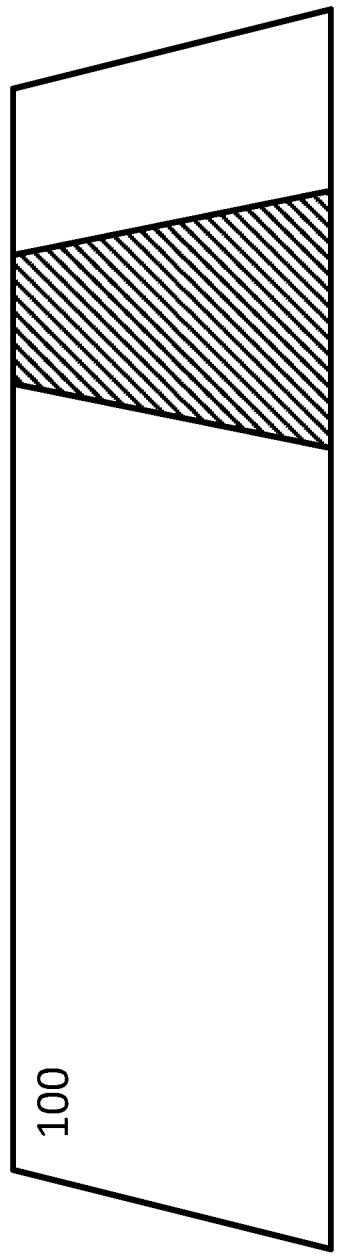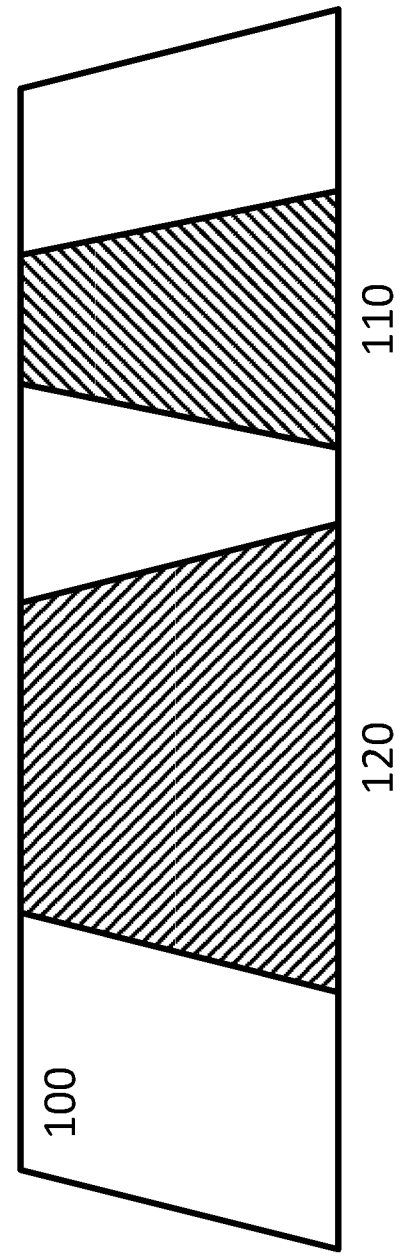
Fig. 2A
Fig. 2B

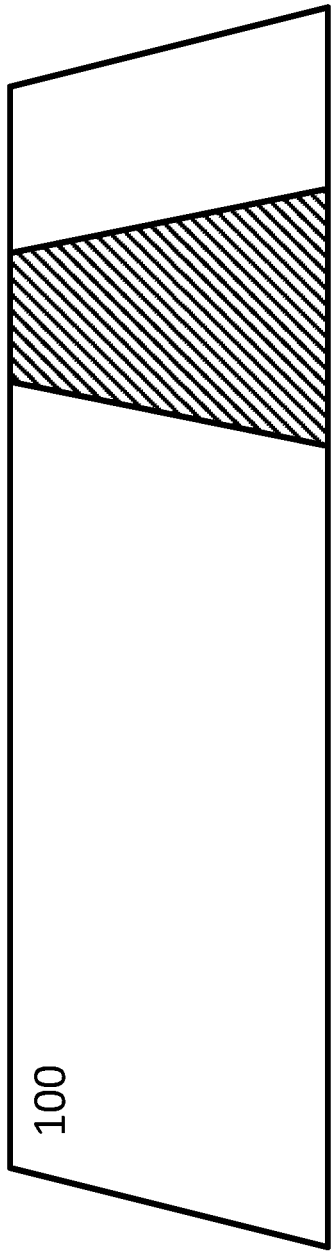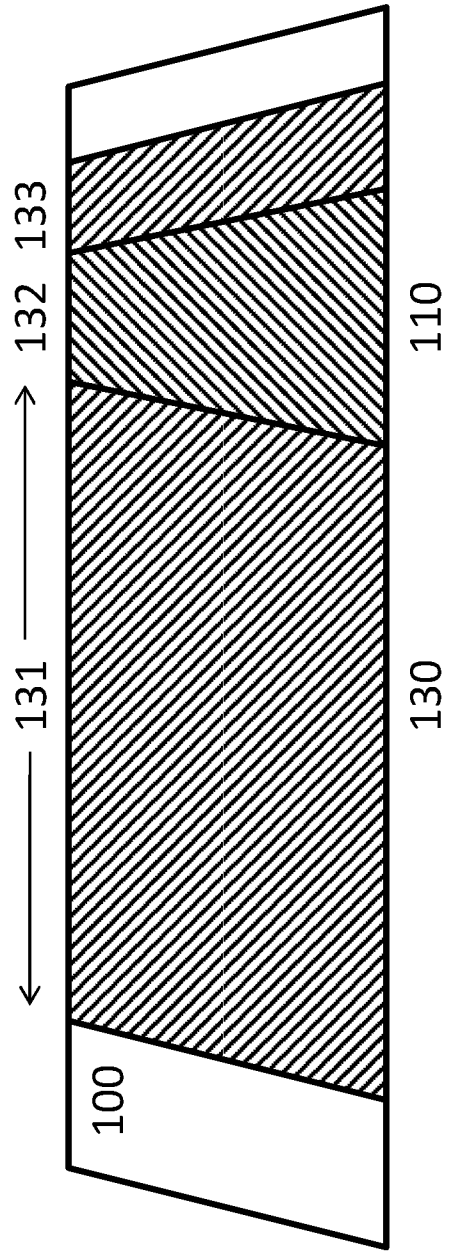
Fig. 3A
Fig. 3B

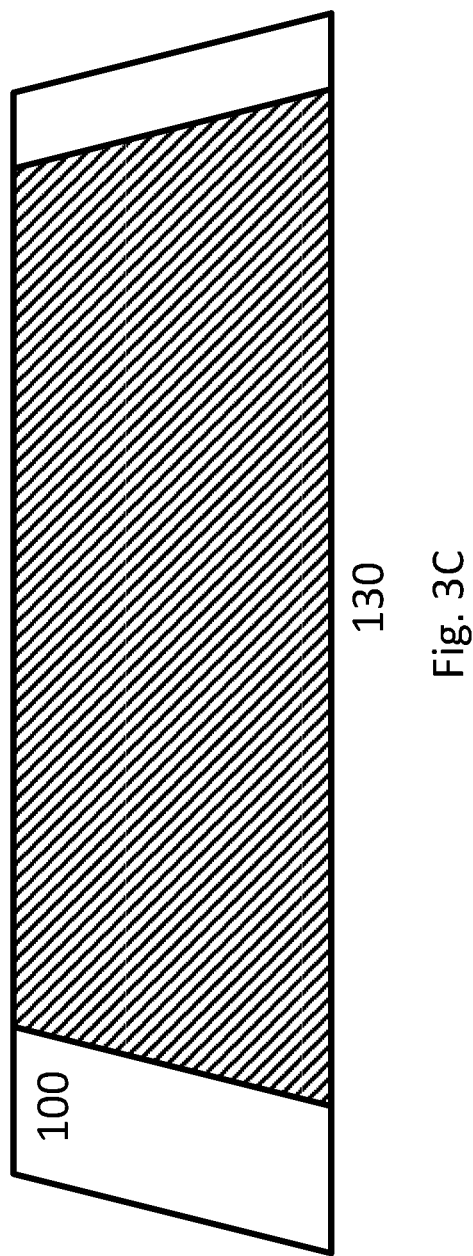

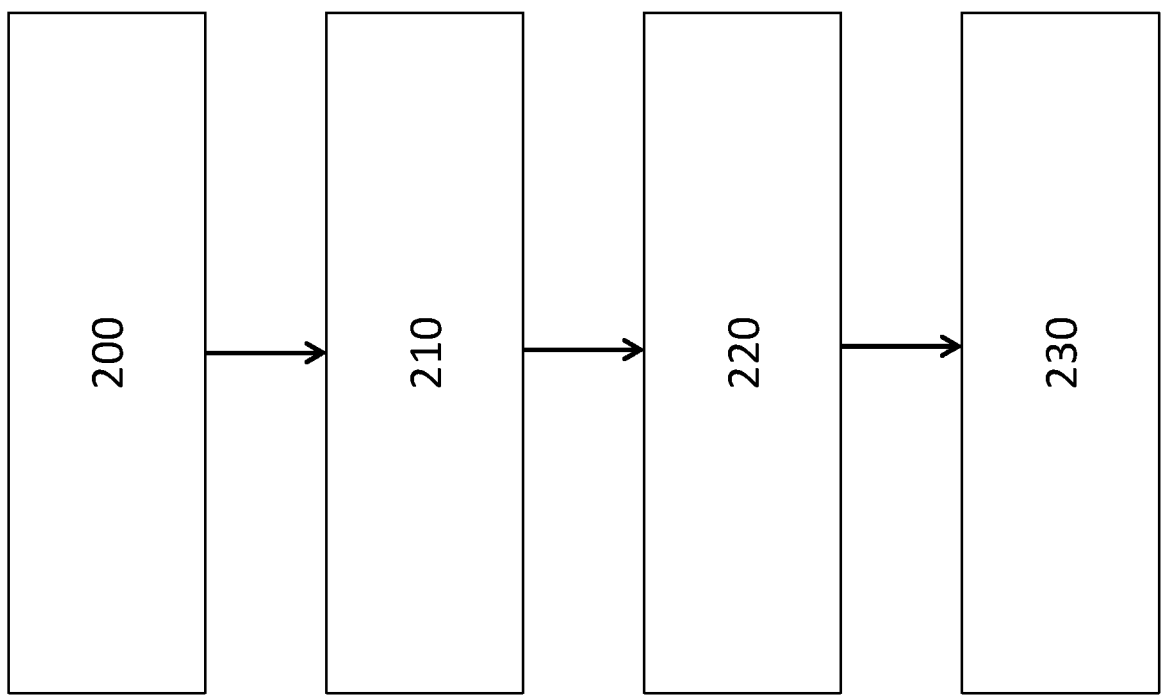

CARRIER BANDWIDTH ADJUSTMENT IN A CELLULAR RADIO NETWORK

RELATED CASES

The present application claims priority to European Patent Application No. 19382775.5, filed Sep. 6, 2019, the disclosure of which is hereby incorporated herein in its entirety.

TECHNICAL FIELD OF THE DISCLOSURE

The disclosure concerns adjusting a bandwidth of a carrier signal providing access to a cellular radio network, particularly in which the access is provided through a High Altitude Platform (HAP), such as an airship or a satellite (considered a HAP in this disclosure).

BACKGROUND TO THE DISCLOSURE

Cellular wireless communication networks provide wide geographical coverage by allowing user (mobile) terminals to access the network through a Radio Access Network (RAN) formed of cells, each cell having a specific geographical coverage area. In this context, a cell refers to a base station (RAN access node) having a cell identifier (Cell ID), for example as used in Third Generation Partnership Project (3GPP) standards. Coverage areas of cells may overlap and this may assist to avoid areas without coverage. Nevertheless, there are still certain areas without cellular wireless network coverage, for example where the deployment of cells is hazardous, difficult, costly or a combination of these. This may particularly occur in rural areas and developing countries.

The use of a High Altitude Platform (HAP) to provide cells, in particular using 4G or 5G, allows coverage on the ground as it would be by a typical Mobile Network Operator (MNO) site, allowing access by the same user or mobile terminals supporting this RAN in the terrestrial networks. In the context of the present disclosure, a satellite will be considered a type of HAP and this term includes any type of radio platform, typically operating above 20 km in altitude and preferably at a specified, nominal, fixed point relative to the Earth. The term HAP as used herein should not be confused with the term "High Altitude Platform Station" used in the International Telecommunication Union (ITU) Radio Regulations, which has a narrower definition than the term HAP of this disclosure. A RAN provided by a HAP infrastructure involves complexities.

Referring first to FIG. 1, there is shown a schematic architecture for an exemplary cellular RAN provided through a HAP, for example a satellite 10. The HAP 10 acts as a repeater between a baseband system 30 and the end users (for example, any SIM-based devices including mobile terminals, not shown). The baseband system 30 generates radio signals for transmission by the HAP 10 and also processes baseband signals received by the HAP 10. Thus, the baseband system 30 provides lower level base station functions (and may be virtualized or non-virtualized). In this case, seven separate intermediate signals are shown (the use of similar dotting or dashing of lines as in other parts of the drawings indicates correspondence). Each intermediate signal represents a baseband carrier signal for a respective cell, each carrier signal having a respective bandwidth. These are provided to a HAP gateway antenna unit 50, which acts as a mixer, multiplexer and ground station radio. The transmission frequency between the gateway antenna unit 50 and the HAP 10 is typically in the Ku-band or Q-band, especially when the HAP 10 is a satellite. The communication between the baseband system 30 and the HAP 10 is thereby made through the antenna 50. The seven intermediate signals (in this case for LTE signals using Orthogonal Frequency Division Multiplexed, OFDM, signals) are transmitted to the HAP 10 multiplexed in frequency, by first intermediate signal 51, second intermediate signal 52, third intermediate signal 53, fourth intermediate signal 54, fifth intermediate signal 55, sixth intermediate signal 56 and seventh intermediate signal 57. The intermediate signals each represent a respective carrier signal. The bandwidth for each signal is different and it is depicted by the width in FIG. 1.

The HAP 10 transmits the seven radio signals using individual, respective beams. The first carrier 51 is transmitted using a first beam to provide a first coverage area 91 (the upper left area shown), the second carrier 52 is transmitted using a second beam to provide a second coverage area 92 (the central area shown), the third carrier 53 is transmitted using a third beam to provide a third coverage area 93 (the top area shown), the fourth carrier 54 is transmitted using a fourth beam to provide a fourth coverage area 94 (the upper right area shown), the fifth carrier 55 is transmitted using a fifth beam to provide a fifth coverage area 95 (the lower right area shown), the sixth carrier 56 is transmitted using a sixth beam to provide a sixth coverage area 96 (the lower central area shown) and the seventh carrier 57 is transmitted using a seventh beam to provide a seventh coverage area 97 (the lower left area). Communication between the HAP 10 and the end users is in the standardized 3GPP radio access bands. Each carrier signal is transmitted within a respective allocated frequency channel.

The HAP 10 is thereby capable of managing a large number of wireless network cells and they can be communicated (that is, transmitted and/or received) over specific areas through directive beams. However, the HAP is limited in both power and bandwidth. The bandwidth limitation especially applies for the link between the HAP 10 and the antenna unit 50. The baseband dimensioning is directly linked to the number of cells to be processed. As a result, the total bandwidth available for transmission (and/or reception) by the HAP in providing the RAN is limited. The same issues may apply whatever form of HAP is used.

In any event, traffic demand can be quite uneven. Not only can this demand sharply change over a short period of time (a number of hours, a day and/or a week), but also HAP coverage may target areas having low population density, so that many cells can be inactive (without traffic demand) for a higher proportion of the time.

Standards set by the Third Generation Partnership Project (3GPP) require a 4G network to transmit a Cell-specific Reference Signal (CRS) over the whole carrier bandwidth, even if the cell is unused. The channel bandwidth for a cell defined in the existing 3GPP Standards are 1.4, 3, 5, 10, 15 and 20 MHz. The channel bandwidths allowed depend on the operating band (for instance, see http://niviuk.free.fr/lte_bandwidth.php). For inactive cells, the optimum is to use the minimum carrier bandwidth, which for example for Band 8 (900 MHz GSM) is 1.4 MHz, so each cell would require this amount of the HAP bandwidth, even without any activity. Thus, the HAP 10 broadcasts seven beams to define seven cells, although four of these (using the fourth carrier 54, fifth carrier 55, sixth carrier 56 and seventh carrier 57) have the minimum carrier bandwidth and are probably empty. That means using 1.4×4=4.6 MHz of HAP bandwidth to signal an empty region. In addition, each cell would consume some baseband resources and the required power to guarantee the desired coverage level.

Adjusting the bandwidth of a cell is therefore desirable. Improving the efficiency of this represents a challenge, especially for the cellular network provided by the HAP.

SUMMARY OF THE DISCLOSURE

Against this background, the present disclosure provides a method for adjusting a bandwidth of a carrier signal providing access to a cellular radio network through a High Altitude Platform (HAP) according to claim 1 and a configuration system in line with claim 15. Other preferred features are disclosed with reference to the claims and in the description below.

Typically, adjusting a bandwidth of a carrier signal transmitted by a HAP begins with the transmission of a first carrier signal of a first bandwidth in a first part of the predetermined frequency spectrum channel (that is, in a part of the maximum spectrum allocated or otherwise designated for the cell to use). Then, a second carrier signal of a second bandwidth (different to the first bandwidth) in a second part of the predetermined frequency spectrum allocation is configured for transmission (as well as the first carrier). The second carrier may correspond with a new cell (which is eventually intended to replace the existing cell). Handover of traffic from the first carrier signal to the second carrier signal is advantageously configured. This may be implemented in the form of a method or by a suitably-arranged configuration system.

In this way, a second carrier within the same predetermined frequency spectrum channel for the cell can be configured (and thus transmitted), whilst the pre-existing carrier is still being transmitted. This allows handover of traffic from the first carrier to the second carrier. This feature allows seamless bandwidth changes in the cell. Optionally, shutdown of the first carrier can then be configured. This technique is particularly useful when the first carrier signal and/or the second carrier signal are Orthogonal Frequency Division Multiplex (OFDM) signals, such as when the cell uses a Long Term Evolution (LTE or 4G) RAN.

Such an approach is beneficial when the cell is provided by a High Altitude Platform (HAP), which may include a satellite in this context. The HAP has an antenna system defining a plurality of beams, such that the beams provide separate geographical coverage areas. Preferably, the first and second carrier signals are transmitted by the same beam or beams of the HAP. The first and second carrier signals are therefore providing service (in terms of the radio access network) to user terminals in the same geographical area. Configuration of the first and second carriers in this context may be effected by communicating configuration data from a baseband system to the HAP, the configuration data indicating parameters of the second carrier signal, for instance including one or more of: transmission power; bandwidth; frequency offset from channel centre; and beams used for transmission. Reconfiguration of the HAP in this bandwidth and/or power limited context may be challenging. The ability to change the bandwidth for the provision of service in this way may allow significant improvements in efficiency and performance for a HAP-providing RAN.

In the preferred embodiment, the second bandwidth is greater than the first bandwidth. In other words, the procedure is used to increase the bandwidth of the cell, although it can also be used to decrease the cell bandwidth (such that the second bandwidth is smaller than the first bandwidth). Increasing the bandwidth may be, for instance, in response to increased traffic through a cell provided by the first carrier signal or increased user or mobile terminals connected to a cell provided by the first carrier signal.

The first carrier (or its centre) is advantageously offset from a centre of the cell predetermined frequency spectrum channel. This may reduce the complexity of adding the second carrier, for example, because user or mobile terminals read the centre of the carrier for initial setup. Avoiding the centre of the carrier being in the centre of the cell predetermined frequency spectrum channel allows more flexibility. For similar reasons, the second part of the predetermined frequency spectrum channel is beneficially offset from a centre of the predetermined frequency spectrum channel, especially when the second bandwidth is less than a whole bandwidth of the predetermined frequency spectrum channel.

In one option, the first and second carriers overlap. In this case, transmission of the overlapping portion of the second carrier signal is supressed or muted. For instance, this suppression may be achieved by allocating the overlapping portion of the second carrier signal a transmission power level that is insufficient to cause interference to reception of the first carrier signal. In OFDM signals, this may be achieved by configuration of one or more Physical Resource Block (PRB) in the overlapping portion. The transmission power level that is insufficient to cause interference may be at least 3 dB and more preferably at least 6 dB, 9 dB, 12 dB or 15 dB lower than the transmission power of the first carrier signal. Optionally, the transmission power level that is insufficient to cause interference may be zero (this may be considered fully muted). Preferably, no (cell-specific) reference signals are transmitted within the supressed portion of the second carrier signal (which may also be considered muted). Advantageously, a broadcast channel of the first carrier signal does not overlap with a broadcast channel of the second carrier signal.

In another option, the second carrier does not overlap with the first carrier. Then, the second carrier may be spaced apart from the first carrier, for example by a guard interval or some other radio frequency spacing.

BRIEF DESCRIPTION OF THE DRAWINGS

The approach of the disclosure may be put into practice in various ways, one of which will now be described by way of example only and with reference to the accompanying drawings in which:

FIGS. 2A, 2B and 2C schematically depict transmissions in the frequency spectrum according to a first example;

FIGS. 3A, 3B and 3C schematically depict transmissions in the frequency spectrum according to a second example;

FIG. 4 illustrates a flowchart for a method in line with the disclosure.

DETAILED DESCRIPTION OF ONE OR MORE PREFERRED EMBODIMENTS

Figure 1:
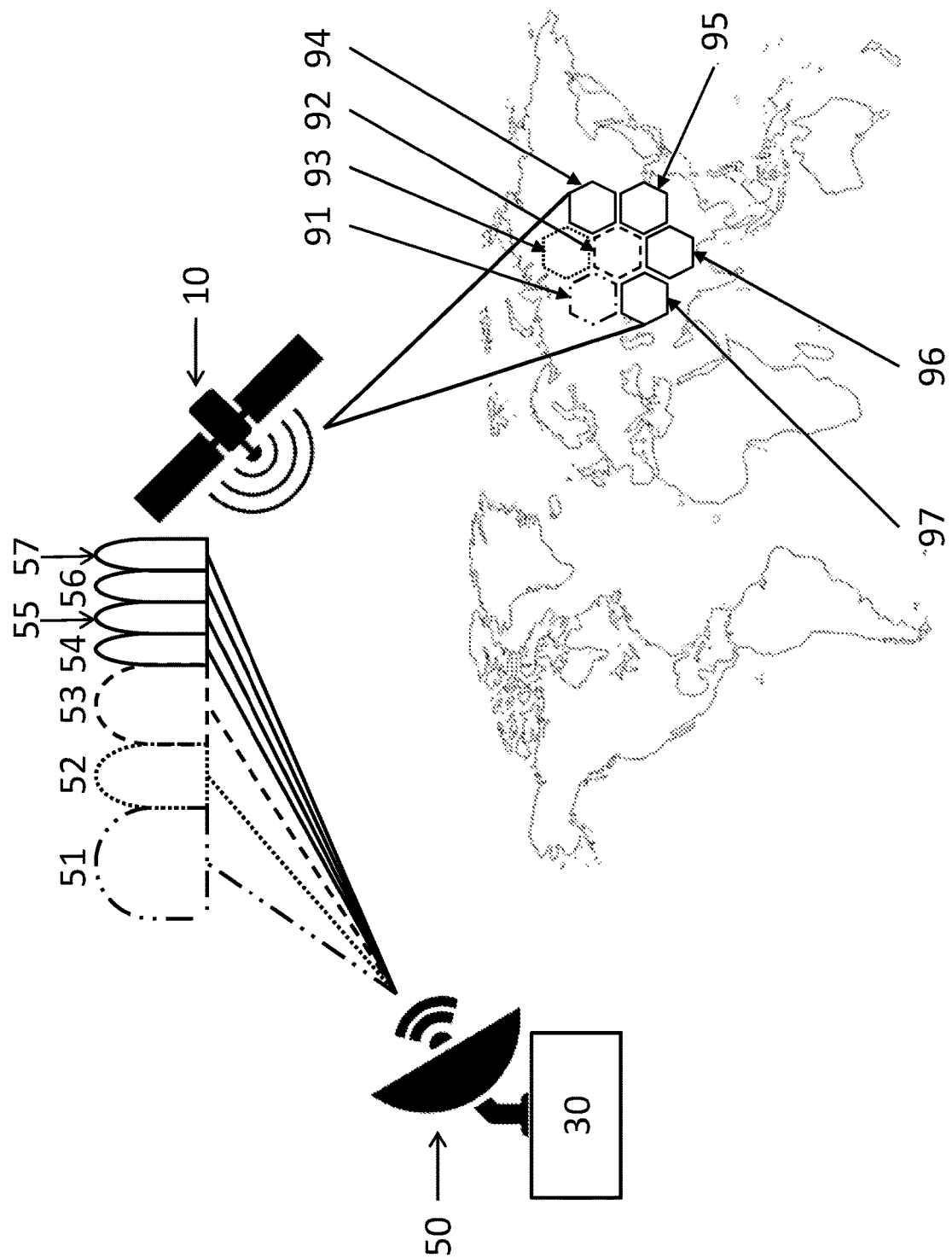
FIG. 1 shows a schematic architecture for an exemplary cellular RAN provided through a HAP.

The arrangement shown in FIG. 1 represents a static cell management, in which each cell is associated to a respective individual beam and has a set bandwidth. The beam coverage for each cell is fixed and given by the beam fingerprint. In existing approaches, the bandwidth of a cell cannot be changed without removing the existing cell and subsequently creating a new cell with a different (higher) bandwidth. This procedure is disruptive to service and may have an impact on users. The disclosure aims to enable seamless bandwidth changes in the cells, in particular with semi-static or dynamic cell management, in which the cell bandwidth may change, for example in accordance with the cell load.

As discussed above, a minimum bandwidth of 1.4 MHz for the cell carrier is required for an LTE RAN defined by existing 3GPP standards. This initial carrier bandwidth is used while the cell remains inactive with no traffic. Once there is a traffic demand (for instance, upon call setup or increased users connected to the cell) for example, a new carrier (which corresponds with a replacement cell) with a higher bandwidth is used for data transmission. As the new carrier is set up, all calls will be handed over to this carrier (cell) and the former 1.4 MHz carrier (cell) is switched off. The initial carrier is not configured in the centre of the total bandwidth channel, but in one of the sides within the channel range. The Broadcast Channel (BCH), which is located within 1.08 MHz of the centre of the carrier, allows user or mobile terminals to read the cell upon initialization, so it is advantageous for the carrier not to be in the centre of the channel. As will be discussed below, offsetting the initial carrier from the centre of the spectral allocation may allow room for the new carrier and in some implementations. For similar reasons, a new carrier may also be offset from the centre of the spectral channel. The process can be repeated, such that the new carrier becomes the initial carrier and a further new carrier is added, of course provided that the initial carrier does not use up the entire spectral channel for the cell.

In general terms, there may therefore be considered a method for adjusting a bandwidth of a carrier signal providing access to a cellular radio network through a High Altitude Platform (HAP). The carrier signal is within a predetermined frequency spectrum channel (for example, the spectrum allocated for the cell to use, particularly in the downlink). The HAP (through at least one of its plurality of beams) transmits a first carrier signal of a first bandwidth in a first part of the predetermined frequency spectrum channel (the first part defining the spectral extent of the first carrier, typically, a first portion of the spectrum channel). The method comprises: configuring transmission (by the HAP through at least one of its beams) of a second carrier signal of a second bandwidth in a second part of the predetermined frequency spectrum channel (the second part defining the spectral extent of the second carrier, in particular not the same as the first part, for example, a second portion of the spectrum channel), the second bandwidth being different to the first bandwidth; and (subsequently) configuring handover of traffic from the first carrier signal to the second carrier signal. In this way, the second carrier signal may replace the first carrier signal for the cell. In particular, the second carrier signal advantageously provides service to the same (or at least a subset of the) geographical coverage area for which the first carrier signal provided service. Transmission of the second carrier is started before the first carrier is shut down, so the two carriers may be transmitted at the same time. This allows efficient handover procedures between the first and second carriers. Optionally, the method may further comprise (subsequent to the step of configuring handover), configuring shutdown of the first carrier signal. Typically, the first carrier signal and the second carrier signal are Orthogonal Frequency Division Multiplex (OFDM) signals and in particular, configured for a 4G RAN.

The method may be implemented as a computer program (for example, configured to perform the method when executed by a processor, such as having instructions accordingly), in software, hardware, firmware, digital logic (optionally reconfigurable, including FPGA devices or similar), programmable memory or circuits,) or equivalent arrangements or a combination of any two or more of these. A computer program product (for instance on a non-transitory computer-readable medium) comprising or storing the computer program may further be considered. There may also be considered a configuration system for adjusting a bandwidth of a carrier signal transmitted by a cell in a cellular radio network, the configuration system being arranged to perform any method as herein disclosed. The configuration system may be part of or coupled to a baseband system for the cell. It may comprise or be comprised in an existing node of the RAN (including the baseband system) or a new node (or server) coupled to an existing node of the RAN, for example coupled to the baseband system.

In the preferred embodiment, the second bandwidth is greater than the first bandwidth (that is, the second carrier has a larger bandwidth than the first carrier). An increase in the bandwidth in this way may be in response to an identification of increased traffic through a cell provided by the first carrier signal or increased user terminals connected to a cell provided by the first carrier signal. In other words, the bandwidth may be linked to the load on the cell. Conversely, the approach of the disclosure can also be used to reduce the cell bandwidth, such that the second bandwidth is smaller than the first bandwidth.

Advantageously, the first part of the predetermined frequency spectrum channel (for instance, the central frequency of the first part or first carrier) is offset from a centre of the predetermined frequency spectrum channel. Additionally or alternatively, the second part of the predetermined frequency spectrum channel is offset from a centre of the predetermined frequency spectrum channel. In some embodiments, the second bandwidth is less than a whole bandwidth of the predetermined frequency spectrum channel. This may allow a third carrier to replace the second carrier, for instance. In such cases, the second part of the predetermined frequency spectrum channel is beneficially offset from a centre of the predetermined frequency spectrum channel.

Figure 2C:
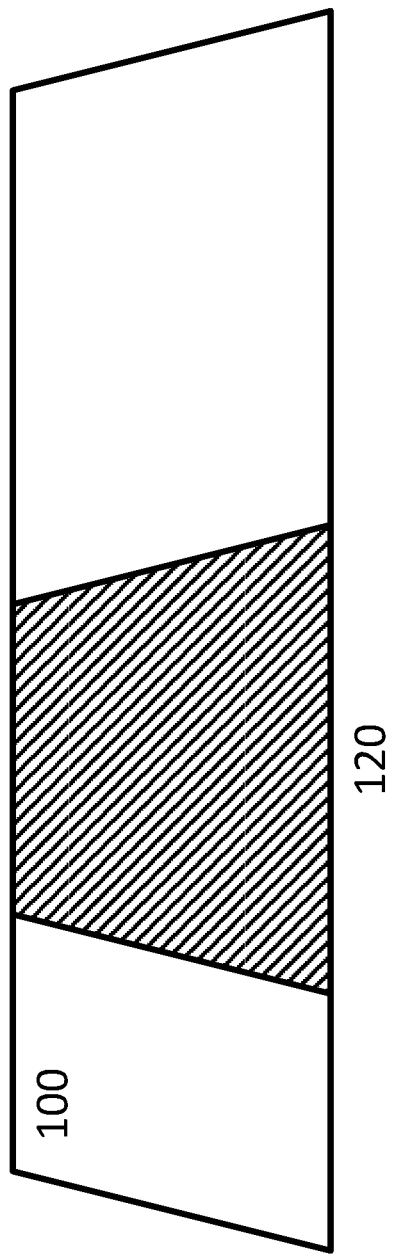

Further features in accordance with this generalized description will be detailed below. Specific implementations will first be discussed, as examples. Referring now to FIGS. 2A, 2B and 2C, there are schematically depicted transmissions in the frequency spectrum according to a first example. In FIG. 2A, there is shown a bandwidth allocation for a cell 100. Within the bandwidth allocation (or channel) 100, there is transmitted a first, initial carrier 110. The first, initial carrier 110 has a minimal bandwidth of 1.4 MHz. Typically, all cells are initially configured with such a minimal bandwidth, as this allows a service to be offered but without any significant traffic passing through the cell. As shown in FIG. 2A, the first, initial carrier 110 is not configured in the centre of the total bandwidth allocation 100 (that is, it is offset from the centre).

Following a call setup and/or the traffic through the cell increasing, the bandwidth is to be increased. As shown in FIG. 2B, a new, second carrier 120 is configured. This has a higher bandwidth than the first carrier 110 and is transmitted in another part of the spectral allocation 100, which does not overlap with the initial, first carrier 110. After transmission of the new, second carrier 120 has started, handover is triggered for all the calls and users of the first carrier 110. As shown in FIG. 2C, the first carrier 110 is switched off, leaving only the second carrier 120, but with a higher bandwidth than the first carrier 110. This process can be repeated with even higher bandwidth carriers, as long as the bandwidths do not overlap and there is sufficient capacity in the channel 100.

Referring now to FIGS. 3A, 3B and 3C, there are schematically depicted transmissions in the frequency spectrum according to a second example. In FIG. 3A, there is shown a bandwidth allocation for a cell 100. This is identical to FIG. 2A and the description above in relation to that drawing also applies here.

Following a call setup and/or the traffic through the cell increasing, the bandwidth is to be increased. As shown in FIG. 3B, a new, second carrier 130 is configured. This has a higher bandwidth than the first carrier 110, but is transmitted to overlap with the initial, first carrier 110 (that is, the two carriers share partially the same frequency spectrum). The second carrier 130 can be split into three parts: a lower frequency, non-overlapping part 131; an overlapping part 132; and a higher frequency, non-overlapping part 133. In the overlapping part 132, the second carrier 130 is configured to mute the Physical Resource Blocks (PRBs) for traffic including the Cell Reference Signals (CRSs). This mitigates the risk of interference to reception of the first carrier 110 by user or mobile terminals. Muting for interference mitigation is described, for example, in "Co-channel interference management using eICIC/FeICIC with coordinated scheduling for the coexistence of PS-LTE and LTE-R networks", Chen et al. EURASIP Journal on Wireless Communications and Networking (2017) 2017:34.

The BCH is transmitted within 1.08 MHz of the centre of new, second carrier 130, that is within the non-overlapping part 131 of the example shown. Hence, it is not overlapped with the initial, first carrier 110, so that the user or mobile terminals can read the new cell in a straightforward way (and without interference). This is, at least in part, a result of the first, initial carrier 110 being offset from the centre of the spectral allocation 100.

After transmission of the new, second carrier 130 has started, handover is triggered for all the calls and users of the first carrier 110. As shown in FIG. 3C, the first carrier 110 is switched off, leaving only the second carrier 130, but with a higher bandwidth than the first carrier 110. This process can be repeated with even higher bandwidth carriers, as long as there is sufficient capacity in the channel 100.

Returning to the general sense discussed above, an embodiment may be considered in which the second part of the predetermined frequency spectrum channel overlaps with the first part of the predetermined frequency spectrum channel. Then, transmission of the portion of the second carrier signal overlapping with the first carrier signal is advantageously supressed. For example, the supressed portion of the second carrier signal may have a transmission power level that is insufficient to cause interference to reception of the first carrier signal. This may be a transmission power level that is no more (or less) than 50% (3 dB), 25% (6 dB), 12.5% (9 dB), 6.25% (12 dB), 3.125% (15 dB), 1% (20 dB) or some lower percentage of an average transmission power level in the remainder of the second carrier signal. Optionally, no reference signals (such as a cell-specific reference signal or CRS) are transmitted within the supressed portion of the second carrier signal. Beneficially, the first carrier signal and the second carrier signal are configured such that a broadcast channel of the first carrier signal does not overlap with a broadcast channel of the second carrier signal. The broadcast channel may be configured within a predefined frequency limit compared with the centre of the respective carrier signal. By offsetting a centre of the first carrier signal and/or the second carrier signal compared with a centre of the predetermined frequency spectrum channel, configuration of the broadcast channels in this way may be made more straightforward. Advantageously, the broadcast channel of the second carrier signal is transmitted in the second carrier signal and not within the supressed portion of the second carrier signal.

In an alternative embodiment, the second part of the predetermined frequency spectrum channel is non-overlapping with the first part of the predetermined frequency spectrum channel. In this way, the first and second carriers may be transmitted simultaneously without any adjustment to them. However, the bandwidth of the second carrier may be limited by the total bandwidth of the predetermined frequency spectrum channel less the bandwidth of the first carrier signal (that is, the first part of the predetermined frequency spectrum channel). The bandwidth of the second carrier may be further limited due to any guard bands implemented between the first and second carriers.

Considering again specific implementation details of examples according to the present disclosure, it will be noted that the techniques and technology described herein is particularly useful for a RAN provided by a HAP or a type of HAP (which may include a HAP in accordance with the present disclosure). For example with reference to previously-discussed FIG. 1, the baseband system 30 may indicate the cells and for each cell, one or more associated: beams; bandwidth; powers; allocated frequency band and/or channel; carriers; frequency offset within the channel (for example, in comparison with the channel centre or edge). Handover instructions may also form part of the signals provided by the baseband system 30.

The power of the initial and new carriers can vary, for example the power spectral density may be kept the same, despite the change in bandwidth between the carriers. Although a carrier may be transmitted by multiple beams, the power at which the carrier is transmitted may vary between beams. Where the two carriers are non-overlapping and transmitted by the same beam or beams, this would be equivalent to having two collocated transmitters with different carriers.

In the general terms discussed previously, the first and second carrier signals are transmitted through a HAP, which may include a satellite, aeroplane, airship, drone or similar). The HAP advantageously has an antenna system defining a plurality of beams, such that the beams provide separate geographical coverage areas. Then, the first and second carrier signals are transmitted by at least one of the plurality of beams. Thus, the first and second carrier signals may be transmitted by a set of one or more beams from the plurality of beams, with the first carrier signal and second carrier signal optionally being transmitted by the same set of one or more beams.

The transmission power level for the first carrier signal and the second carrier signal may be different. For example, the power spectral density of the first carrier signal and the second carrier signal as transmitted may be the same.

In embodiments, the step of configuring transmission of a second carrier signal comprises communicating configuration data from a baseband system to the HAP, the configuration data indicating at least one parameter of the second carrier signal and/or at least one parameter of the first carrier signal. The parameter or parameters may comprise one or more of: transmission power for the carrier for each beam of the plurality of beams used for transmitting the respective carrier signal; a bandwidth for the respective carrier signal; a transmission band and/or channel for the respective carrier signal; and an offset for transmission of the respective carrier signal within the channel (compared with a fixed point in the channel, such as an edge or a centre). The at least one parameter of the second carrier signal and/or at least one parameter of the first carrier signal may be transmitted in the form of a lookup table.

Referring now to FIG. 4, there is illustrated a flowchart for a method in line with the disclosure. In a first step 200, a first carrier signal of a first bandwidth is transmitted in a first part of a predetermined frequency spectrum allocation (channel). In particular, the first carrier signal is being transmitted through a HAP to allow access to a cellular radio network. In a second step 210, a second carrier signal is configured. The second carrier signal has a second bandwidth that is different from the first bandwidth. The second carrier signal is in a second part of the predetermined frequency spectrum allocation (channel), different from the first part. This configuration may be implemented by instructing the HAP, for example, by transmitting and/or receiving instructions from a configuration system (such instructions comprising a message, one or more information elements, a lookup table or other command or instructions format). The configuration system is generally separate from the HAP and typically distant from the HAP (for example, located on the ground). The second carrier signal may be implemented in any form disclosed herein, for example non-overlapping with the first carrier signal or overlapping with the first carrier signal. Following configuration of the second carrier signal, the second carrier is transmitted, such that the first carrier signal and the second carrier signal are transmitted at the same time.

In a third step 220, handover of traffic from the first carrier signal to the second carrier signal is configured. This may be implemented by instructing user equipment or terminals connected using the first carrier signal to handover to the second carrier signal (for example, by sending such instructions using the first carrier signal). Other mechanisms for encouraging handover to the second carrier signal may be implemented. In a fourth step 230 (which is preferable, but not essential, as the first carrier signal may not be used or used only infrequently once the second carrier signal is in use), the first carrier signal is configured to be shut down. Shutting down the first carrier signal prevents its transmission.

Figure 5:
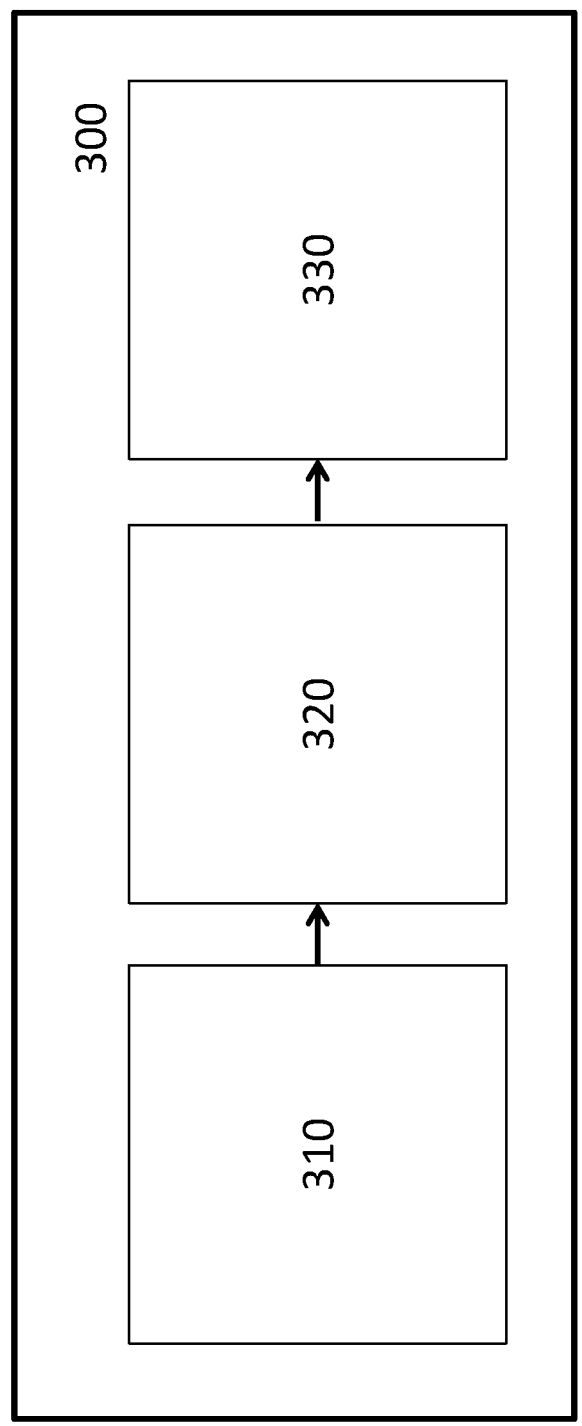
FIG. 5 shows a schematic block diagram of a configuration system in accordance with the disclosure.

Referring now to FIG. 5, there is shown a schematic block diagram of a configuration system 300. As noted above, a configuration system may form part of an existing part of the RAN, for example the baseband system, or it may be a separate unit or server that is typically coupled to the RAN (for instance, baseband system). The configuration system 300 comprises: an input 310; a processing part 320; and an output 330. The configuration system 300 may be embodied by a computer (server) with appropriate interfaces, for instance as discussed below.

The input 310 may comprise an interface to another part of the RAN, for example the baseband system. The input 310 may be configured to receive information regarding a change in bandwidth for a cell. This may be an instruction to change the bandwidth to a specific value or information indicative of a new bandwidth for the cell. The processing part 320 (for instance, a processor or group of processors) is then configured to determine a configuration for the cell, for example in accordance with the approach described with reference to FIG. 4 above. The output 330 then communicates this configuration to the HAP, for example through the baseband system or other communication link. The input 310 and output 330 may be separate interfaces, or they may be provided by a joint input/output interface to the configuration system 300.

Although a specific embodiment has now been described, the skilled person will understand that various modifications and variations are possible. Also, combinations of any specific features shown with reference to one embodiment or with reference to multiple embodiments are also provided, even if that combination has not been explicitly detailed herein. For example, a new non-overlapping carrier for a cell may be followed by a new overlapping carrier for the cell, when the demand increases further.

For example, the specific architecture of FIG. 1 is only an example and alternative architectures are possible. The baseband may be implemented differently to that discussed and other interfaces may be employed.

In the example in which an overlapping portion of the second carrier is suppressed, the transmission symbols within this portion need not necessarily be muted. Other forms of suppression, such as power reduction, coding or similar may be used instead.

The invention claimed is:

1. A method for adjusting a bandwidth of a carrier signal providing access to a cellular radio network through a High Altitude Platform, HAP, the carrier signal being transmitted within a predetermined frequency spectrum channel, the HAP transmitting a first carrier signal of a first bandwidth in a first part of the predetermined frequency spectrum allocation, the method comprising:
configuring transmission of a second carrier signal of a second bandwidth in a second part of the predetermined frequency spectrum allocation, the second bandwidth being different to the first bandwidth; and
configuring handover of traffic from the first carrier signal to the second carrier signal.

2. The method of claim 1, wherein the second bandwidth is greater than the first bandwidth.

3. The method of claim 2, wherein the step of configuring transmission of a second carrier signal is in response to an identification of increased traffic through a cell provided by the first carrier signal or increased user terminals connected to a cell provided by the first carrier signal.

4. The method of claim 1, wherein the first part of the predetermined frequency spectrum allocation is offset from a centre of the predetermined frequency spectrum channel.

5. The method of claim 1, wherein the second bandwidth is less than a whole bandwidth of the predetermined frequency spectrum channel and wherein the second part of the predetermined frequency spectrum channel is offset from a centre of the predetermined frequency spectrum channel.

6. The method of claim 1, further comprising:
configuring shutdown of the first carrier signal.

7. The method of claim 1, wherein the first carrier signal and the second carrier signal are Orthogonal Frequency Division Multiplex, OFDM, signals.

8. The method of claim 1, wherein the second part of the predetermined frequency spectrum channel overlaps with the first part of the predetermined frequency spectrum channel and wherein transmission of a portion of the second carrier signal overlapping with the first carrier signal is supressed or muted.

9. The method of claim 8, wherein the supressed or muted portion of the second carrier signal has a transmission power level that is insufficient to cause interference to reception of the first carrier signal.

10. The method of claim 8, wherein no reference signals are transmitted within the supressed or muted portion of the second carrier signal.

11. The method of claim 8, wherein the first carrier signal and the second carrier signal are configured such that a broadcast channel of the first carrier signal does not overlap with a broadcast channel of the second carrier signal.

12. The method of claim 1, wherein the second part of the predetermined frequency spectrum allocation is non-overlapping with the first part of the predetermined frequency spectrum allocation.

13. The method of claim 1, wherein the HAP has an antenna system defining a plurality of beams, such that the beams provide separate geographical coverage areas, the first and second carrier signals being transmitted by at least one of the plurality of beams.

14. The method of claim 1, wherein the step of configuring transmission of a second carrier signal comprises:
communicating configuration data from a baseband system to the HAP, the configuration data indicating at least one parameter of the second carrier signal.

15. A configuration system for adjusting a bandwidth of a carrier signal providing access to a cellular radio network through a High Altitude Platform, HAP, the configuration system being arranged to perform the method of claim 1.

* * * * *